United States Patent [19]

Ohya

[11] Patent Number: 4,709,957

[45] Date of Patent: Dec. 1, 1987

[54] FRONT DOOR STRUCTURE FOR VEHICLE

[75] Inventor: Takegi Ohya, Hiroshima, Japan

[73] Assignee: Mazda Motor Corporation, Japan

[21] Appl. No.: 803,554

[22] Filed: Dec. 2, 1985

[30] Foreign Application Priority Data

Dec. 4, 1984 [JP] Japan ................... 59-256697

[51] Int. Cl.$^4$ .............................................. B60J 1/00
[52] U.S. Cl. ...................... 296/146; 49/374;
98/2.04
[58] Field of Search ............... 296/146; 98/2.04, 2.19;
49/227, 374

[56] References Cited

U.S. PATENT DOCUMENTS

| 4,407,540 | 10/1983 | Korff | 296/146 |
| 4,464,303 | 7/1984 | Gebhard | 98/2.04 |

FOREIGN PATENT DOCUMENTS

| 2318097 | 10/1974 | Fed. Rep. of Germany | 98/2.04 |
| 3236751 | 4/1984 | Fed. Rep. of Germany | 296/146 |
| 3238451 | 4/1984 | Fed. Rep. of Germany | 296/146 |
| 164808 | 5/1955 | Japan . | |
| 38111 | 3/1984 | Japan | 98/2.04 |

Primary Examiner—Robert R. Song
Attorney, Agent, or Firm—Gerald J. Ferguson, Jr.;
Michael P. Hoffman; Michael J. Foycik, Jr.

[57] ABSTRACT

A front door for a vehicle comprises an inner panel and an outer panel. A window sash having a closed cross section is formed by the inner panel and the outer panel. The window sash is divided into a front sash portion and a rear sash portion by a vertical dividing member. A windowpane is fixedly bonded to the front sash portion to cover at least the windshield side edge of the front sash portion. The front sash portion is provided with an air discharge opening which is adapted to be communicated with an air duct of an air conditioner unit provided in the vehicle by way of the interior of the window sash and opens toward the windowpane.

8 Claims, 5 Drawing Figures

FRONT DOOR STRUCTURE FOR VEHICLE

BACKGROUND OF THE INVENTION

1. Field of the Invention

This invention relates to a front door structure for a vehicle.

2. Description of the Prior Art

Recently, various attempts have been made to provide vehicles with a flush outer surface in order to improve the aerodynamic properties of the vehicle body. This is, for example, the aim of the front door structure disclosed in Japanese Unexamined Utility Model Publication No. 56(1981)-143475, wherein the outer surface of the window sash of the front door and the outer surface of the windowpane of the front door are made flush with each other.

In accordance with the prior art, unevenness between the window sash of the front door and the windowpane of the same can be removed to some extent but the surface of the windshield and the surface of the window sash of the front door remain uneven.

Further, the windowpane of the front door tends to become fogged due to the temperature difference between the inside and the outside of the windowpane. As a result, the driver's field of view is narrowed. Japanese Unexamined Utility Model Publication No. 56(1981)-164808 discloses a structure in which an air discharge opening is provided in the door inner panel and hot air is blown against the windowpane in order to defog or defrost the windowpane. However, in accordance with the structure disclosed in this publication, the hot air discharged from the air discharge opening in the front door inner panel is apt to impinge upon the windowpane only at the rear part thereof and accordingly the front part of the same cannot be defogged or defrosted.

SUMMARY OF THE INVENTION

In view of the foregoing observations and description, the primary object of the present invention is to provide a front door structure in which the outer surface of the windshield and the outer surface of the front door smoothly merge with each other and at the same time, the front part of the windowpane of the front door can be effectively defogged and defrosted.

The front door structure in accordance with the present invention comprises an inner panel and an outer panel. A window sash having a closed cross section is formed by the inner panel and the outer panel. The window sash is divided into a front sash portion and a rear sash portion by a vertical dividing member. A windowpane is fixedly bonded to the front sash portion to cover at least the windshield side edge of the front sash portion. The front sash portion is provided with an air discharge opening which is adapted to be communicated with an air duct of an air conditioner unit provided in the vehicle by way of the interior of the window sash and opens toward the windowpane.

Hot air fed from the air conditioner unit to the air discharge opening through the interior of the window sash is discharged from the air discharge opening to the windowpane to defog or defrost it.

DESCRIPTION OF THE PREFERRED EMBODIMENT

Figure 1:
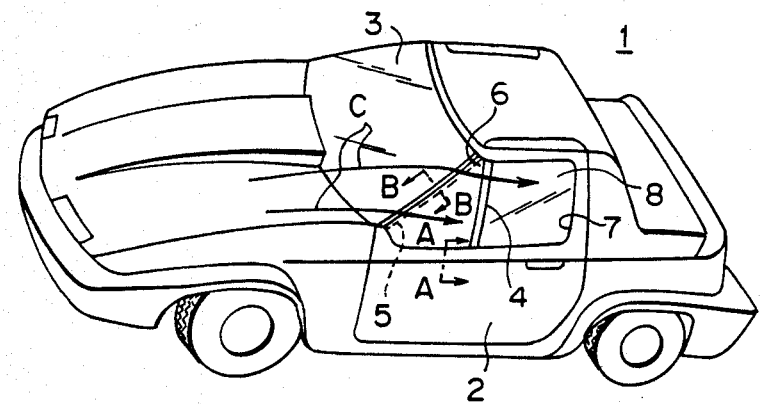
FIG. 1 is a perspective view of a vehicle provided with a front door in accordance with an embodiment of the present invention.

In FIG. 1, which shows a vehicle 1 provided with a front door in accordance with an embodiment of the present invention, reference numeral 2 denotes the front door and reference numeral 3 denotes the windshield. The window sash of the front door 2 is divided by a vertical dividing member 4 into a front sash portion 5 and a rear sash portion 7. The front sash portion 5 supports a forward windowpane 6 which is triangular in shape, and the rear sash portion 7 supports a rearward windowpane 8 which is rectangular in shape.

Figure 2:
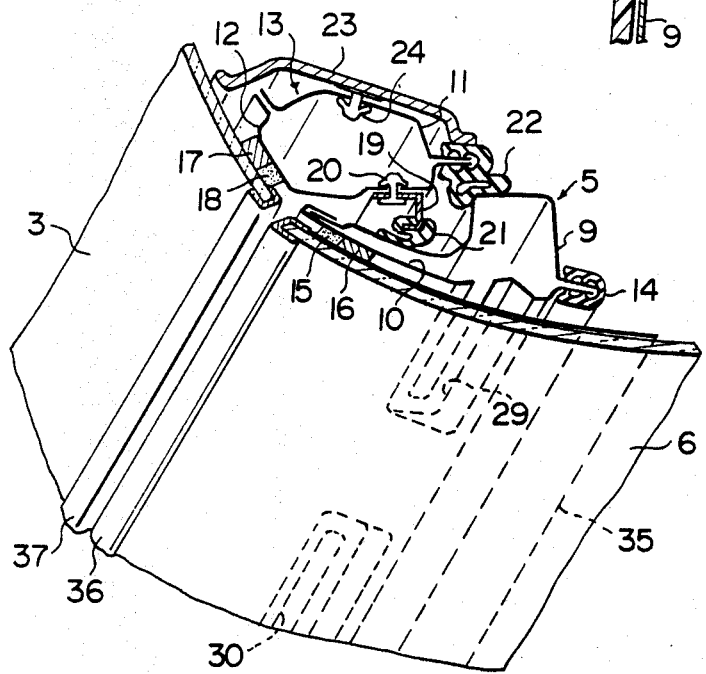
FIG. 2 is a fragmentary perspective view partly in cross section showing a corner portion between the windshield and the windowpane of the front door of the vehicle shown in FIG. 1.

As shown in FIG. 2, the front sash portion 5 is formed by a door inner panel 9 and a door outer panel 10 and has a substantially closed cross-section. The front sash portion 5 is covered with the forward windowpane 6 positioned on the outer side thereof. A front pillar 13 is formed by a pillar inner 11 and a pillar outer 12, and has a substantially closed cross-section. The front pillar 13 is covered with the windshield 3 positioned on the outer side thereof. The forward windowpane 6 and the windshield 3 are curved inward at the corner therebetween so that the front edge of the forward windowpane 6 and the side edge of the windshield 3 are opposed to each other with their outer surfaces being flush with each other.

The door inner panel 9 and the door outer panel 10 are connected together at their front ends by hemming. Further, the inner and outer panels 9 and 10 are connected together at their rear ends and the junction therebetween is covered with a seaming welt 14. The front edge of the forward windowpane 6 is fixed to the front edge portion of the door outer panel 10 by adhesive 16 constrained by a dam 15.

The side edge of the windshield 3 is fixed to the pillar outer 12 by adhesive 18 constrained by a dam 17. A rain rail 19 is fixed to the pillar outer 12 by a clip 20. To the free end of the rain rail 19 is attached a weather strip 21 in contact with the door inner panel 9. To the rearward junction of the pillar inner 11 and the pillar outer 12 is attached a weather strip 22 in contact with the door inner panel 9. A trim 23 is fixed to the pillar inner 11 by a clip 24.

Figure 3:
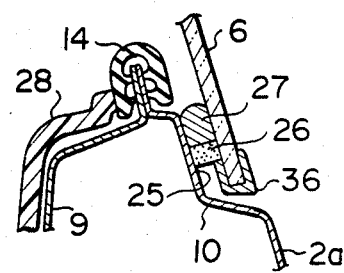
FIG. 3 is a cross-sectional view taken along line A—A in FIG. 1.

As shown in FIG. 3, the lower edge of the forward windowpane 6 is fixed, by adhesive 27 constrained by a dam 26, to the mounting portion 25 of the door outer panel 10 formed by inwardly recessing the part of the door outer panel 10, whereby the outer surface of the forward windowpane 6 is flush with the outer surface 2a of the door panel in the vertical direction. In FIG. 3, reference numeral 28 denotes a door trim.

The outer side of the front sash portion 5, or the door outer panel 10 is provided with a plurality of recessed portions 29 vertically spaced from each other. Each recessed portion 29 is triangular in cross section and has an oblique surface directed obliquely rearwardly. An elongated air discharge opening 30 is provided in the oblique surface of each recessed portion 29 to extend vertically.

Figure 4:
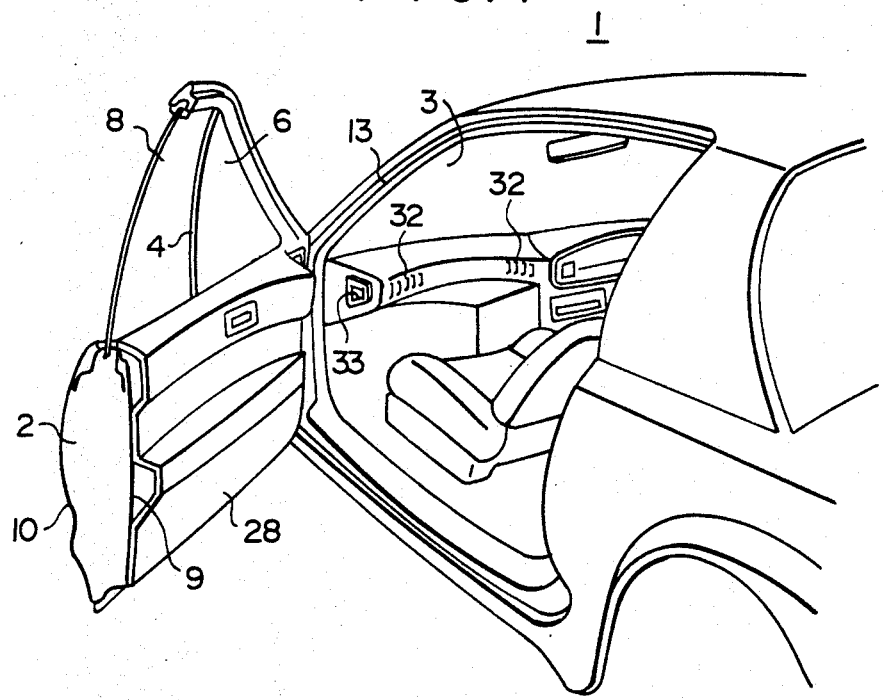
FIG. 4 is a fragmentary perspective view of the vehicle with a front door opened.
Figure 5:
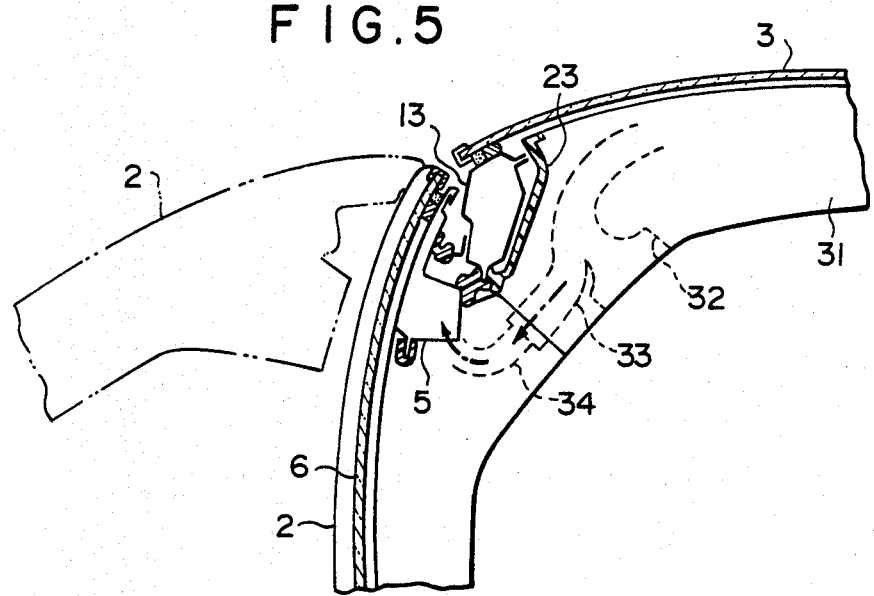
FIG. 5 is a cross-sectional view taken along line B—B in FIG. 1.

As shown in FIG. 4, the instrument panel 31 of the vehicle 1 is provided with louvers 32 through which air from an air conditioner unit (not shown) is discharged into the passenger compartment. As shown in FIG. 5, the air from the air conditioner unit flows through an air duct 33 to the louvers 32. An extension of the air duct 33 projects from a side of the instrument panel 31. A connection tube 34 extends from the front sash portion 5 and projects from the door trim 28. The projecting end of the connection tube 34 is positioned to be connected to the extension of the air duct 33 when the front door 2 is closed.

The front edge portion of the forward windowpane 6 is applied with a ceramic coating 35 on the inner surface thereof so that the front edge portion of the front sash portion 5 cannot be viewed from the outside. The forward windowpane 6 and the windshield 3 are respectively provided with edge protectors 36 and 37.

Connection of the forward windowpane 6 to the dividing member 4 is effected in a manner similar to the connection to the front sash portion 5. The rearward windowpane 8 is supported for up-and-down movement in this embodiment, but may be fixedly mounted like the forward windowpane 6, if desired.

In the front door 2, the outer surface of the windshield 3 and the outer surface of the forward windowpane 6 smoothly merge with each other and accordingly the air streamline makes a gentle continuous curve, whereby the aerodynamic properties of the vehicle body can be improved. Further, air from the air conditioner unit is blown against the inner surface of the forward windowpane 6 from the air discharge openings 30 by way of the air duct 33, the connection tube 34 and the front edge portion of the front sash portion 5 to defog or defrost the forward windowpane 6 or to prevent fogging and frosting on the forward windowpane 6. Since the air discharge openings 30 are directed obliquely rearward, the air discharged from the openings 30 flows rearwardly along the inner surface of the forward windowpane 6 between the front sash portion 5 and the forward windowpane 6 and accordingly the forward windowpane 6 can be effectively defogged or defrosted, whereby a sufficiently wide field of view can be ensured even if a door mirror is mounted on the front door 2. Further the air fed from the air conditioner unit and flowing through the interior of the front door 2 removes moisture in the front door 2 and contributes to corrosion prevention. Generally, the door inner panel 9 and the door outer panel 10 are subjected to electrodeposition coating in the connected condition. As a result, the coating on the inner surface of the windowpane sash has been conventionally unsatisfactory. However, in the front door of this embodiment, an excellent coating can be applied to the inner surface of the window sash through the air discharge opening, whereby corrosion prevention can be further improved.

Though, in the embodiment described above, the present invention is applied to a two-door type vehicle, the present invention can also be applied to vehicles of various other types. Further, the shape of the forward windowpane need not be limited to a triangle as in the embodiment described above but may be a trapezoid, for example.

I claim:

1. A front door structure for a vehicle comprising an inner panel and an outer panel, a window sash having a closed cross section being formed by the inner panel and the outer panel wherein the window sash is divided into a front sash portion and a rear sash portion by a vertical dividing member, a windowpane is fixedly bonded to the front sash portion by bonding means to cover at least the windshield side edge portion of the front sash portion and the front sash portion is provided with at least one air discharge opening which is adapted to be communicated with an air duct of an air conditioner unit provided in the vehicle way of the interior of the window sash and opens toward the windowpane, means defining a space formed along said outer panel of the front sash portion between the outer panel and a forward portion of said windowpane and a connecting portion formed by said bonding means between the outer panel and a front edge portion of the forward portion of said windowpane, said space being formed rearward of said connecting portion, an air passage in the front sash portion communicating with said space between the outer panel and the forward portion of the windowpane via said at least one air discharge opening which opens into the outer panel so that air flows into said space through the at least one air discharge opening, hits an inner surface of the forward portion of the windowpane and disperses rearward of the at least one air discharge opening by rearward flow.

2. A front door structure as defined in claim 1 in which said front sash portion is provided with a connecting portion which extends to a front edge of a door trim and is adapted to be connected, when the front door is closed, with an extension of the air duct of the air conditioner unit projecting from a side of the instrument panel.

3. A front door structure as defined in claim 1 in which said at least one air discharge opening is formed in a recessed portion formed in the front sash portion.

4. A front door structure as defined in claim 3 in which said recessed portion has an obliquely rearwardly directed wall portion and said air discharge opening is formed in the obliquely rearwardly directed wall portion.

5. A front door structure as defined in claim 1 in which a plurality of said air discharge openings are formed in the front sash portion.

6. A front door structure as defined in claim 5 in which each of said at least one air discharge openings is elongated in shape.

7. A front door structure as defined in claim 1 in which said windowpane fixed to the front sash portion and the windshield of the vehicle are curved inward at the corner therebetween so that the front edge of the windowpane and the side edge of the windshield are opposed to each other with their outer surfaces being flush with each other.

8. A front door structure as defined in claim 1 in which the lower surface of the windowpane fixed to the front sash portion is fixedly bonded to the door panel and the outer surface of the windowpane and the outer surface of the door panel are substantially flush with each other as viewed in the vertical direction.

* * * * *